Nov. 25, 1958  R. DE KYVON  2,861,315
SAFETY PIN
Filed Dec. 5, 1955
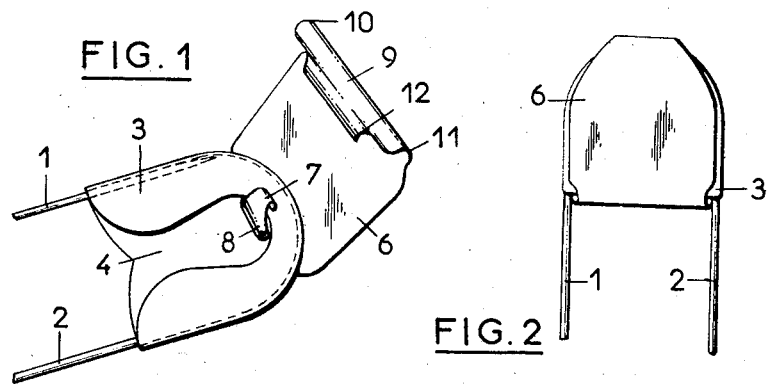
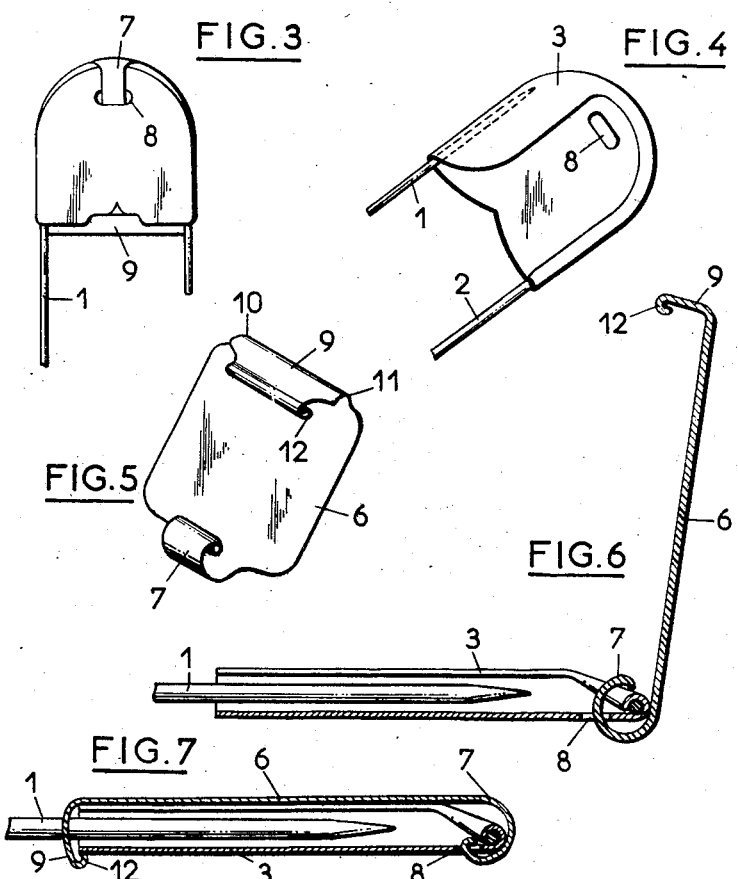
Inventor
R. deKyvon United States Patent Office 2,861,315
Patented Nov. 25, 1958

2,861,315
SAFETY PIN
Robert De Kyvon, Tangier, Morocco
Application December 5, 1955, Serial No. 551,138
4 Claims. (Cl. 24—157)

This invention relates generally to safety pins, and more particularly to a safety pin having a locking clasp rotatably mounted on the head thereof for masking the slot through which the pointed arm of the pin is engaged and disengaged from.

In the prior art safty pins of this type, the locking clasp is hinged parallel to the arms of the pin thereby requiring the application of a force to disengage the clasp in the same direction as required to disengage the pointed arm from the pin head.

Accordingly, an object of the present invention is to provide a safety pin having a locking clasp in which the force required to disengage the clasp is substantially perpendicular to the force required to disengage the pointed arm from the head.

Another object of the instant invention is to provide a safety pin having a locking clasp with several locking means.

The invention extends also to the following embodiments and their various possible combinations.

According to the invention, a safety pin is shown, as a non limiting example, on the accompanying drawings where:

Fig. 1 is a perspective partial view of the safety pin including its locking member.

Fig. 2 is a front view of this pin in locked position.

Fig. 3 is a view showing the other face of the pin of Fig. 2.

Fig. 4 is a partial view of the pin without the locking member.

Fig. 5 is a perspective view showing in detail the locking member.

Fig. 6 is a sectional view of the unlocked pin.

Fig. 7 is a sectional view of the locked pin.

The conventional safety pin shown in the accompanying drawings is made up of a wire shaped so as to form two arms 1 and 2 arm 1 being the pointed arm, and of a head 3 forming a housing for the pointed arm when in the closed position. This head presents a slot 4 to permit the opening and the closing of the pin.

The locking member comprises a clasp 6 rotatably mounted on the head 3 which can be folded back on the latter to mask the conventional slot 4 by which the pin is opened and closed. This clasp 6 carries a tab 7, engaged in an opening 8 perpendicular to the direction of the arms provided on the top part of the back 3. This tab is curved, as shown in Figs. 5, 6 and 7, to provide a hinge when engaged in the slot 8. At the opposite side of clasp 6 another tab 9 is curved back in a U shape and is designed so as to form two notches 10 and 11 delimiting the tab relatively to the clasp 6. In locked position, the tab 9 is forced between the arms 1 and 2 which press yieldingly on both sides of the tab the arms being thus locked in the respective notches.

Furthermore, the free end of this tab 9 may be folded back to form a flange 12 which will be forced to rest behind the head 3 of the pin with the result of further securing the locking member in closed position, whereby is realized in a very simple way, a pin ensuring an absolute double safety.

What I claim is:

1. In combination with a safety pin having a pair of substantially parallel positioned resiliently connected arms, and a housing affixed to one end of a first one of said arms adaptable to receive one end of the other of said arms, a locking clasp comprising a plate member, a hinge tab integrally formed upon said member for rotatably mounting said member upon the housing, and a locking tab integrally formed upon said member and being adapted to maintain the arms of the safety pin spatially locked within the housing upon rotation of said member about said housing in a direction parallel to said arms.

2. In combination with a safety pin having a pair of substantially parallel positioned resiliently connected arms, and a housing affixed to one end of a first one of said arms for reception of one end of the second one of said arms when in a closed position, a clasp comprising a plate member, a hinge tab integrally formed upon one end of said member for mounting said member on the housing for rotatable movement in a direction parallel to the arms, and a locking tab integrally formed upon the opposite end of said member and being adapted to maintain the arms of the pin when in a closed position spatially locked within the housing.

3. A clasp according to claim 2 wherein said locking tab comprises a U-shaped portion having an indentation formed on each side thereof.

4. A clasp according to claim 3 wherein said locking tab includes a crooked extremity formed thereon for resiliently engaging the housing intermediate of the arms of the safety pin when in a closed position.

References Cited in the file of this patent
UNITED STATES PATENTS
671,615     Snedeker _____ Apr. 9, 1901
FOREIGN PATENTS
788,086     France _____ 1935